US006810395B1

(12) United States Patent
Bharat

(10) Patent No.: US 6,810,395 B1
(45) Date of Patent: Oct. 26, 2004

(54) METHOD AND APPARATUS FOR QUERY-SPECIFIC BOOKMARKING AND DATA COLLECTION

(75) Inventor: Krishna A. Bharat, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/444,524

(22) Filed: Nov. 22, 1999

(51) Int. Cl.$^7$ .......................... G06F 17/30; G06F 7/00
(52) U.S. Cl. .......................... 707/4; 707/10; 707/104.1
(58) Field of Search .......................... 707/1–5, 104.1, 707/10

(56) References Cited

U.S. PATENT DOCUMENTS

| | | | | | |
|---|---|---|---|---|---|
| 5,220,625 | A | * | 6/1993 | Hatakeyama et al. | 345/809 |
| 5,625,781 | A | * | 4/1997 | Cline et al. | 345/854 |
| 5,666,502 | A | * | 9/1997 | Capps | 345/811 |
| 5,721,897 | A | * | 2/1998 | Rubinstein | 707/2 |
| 5,794,233 | A | * | 8/1998 | Rubinstein | 707/4 |
| 5,913,215 | A | * | 6/1999 | Rubinstein et al. | 707/10 |
| 5,917,492 | A | * | 6/1999 | Bereiter et al. | 345/854 |
| 5,978,833 | A | * | 11/1999 | Pashley et al. | 709/200 |
| 6,006,222 | A | * | 12/1999 | Culliss | 707/5 |
| 6,014,665 | A | * | 1/2000 | Culliss | 707/5 |
| 6,169,986 | B1 | * | 1/2001 | Bowman et al. | 707/5 |
| 6,184,886 | B1 | * | 2/2001 | Bates et al. | 345/760 |
| 6,195,652 | B1 | * | 2/2001 | Fish | 707/2 |
| 6,237,033 | B1 | * | 5/2001 | Doeberl et al. | 709/223 |
| 6,247,021 | B1 | * | 6/2001 | Himmel et al. | 707/104.1 |
| 6,253,208 | B1 | * | 6/2001 | Wittgreffe et al. | 707/104.1 |
| 2001/0020242 | A1 | * | 9/2001 | Gupta et al. | 707/501.1 |

FOREIGN PATENT DOCUMENTS

EP 0435805 A2 * 7/1991 ........... G06F/15/40

OTHER PUBLICATIONS

Savetz, K.M. "Jiving with Javascript", WebDeveloper Magazine, vol. 2, No. 2, Spring 1996.*
Ellsworth, J. et al. "The Internet Unleashed 1997", Indianapolis:Sams.net Publishing, 1997, pp. 795–796.*
"Tools to Supercharge Your Searching", Netguide, No. 405, 1997, p. 69.*
Marias, H. and K. Bharat "Supporting Cooperative and Personal Surfing with a Desktop Assistant", Proceedings of the $10^{th}$ Annual ACM Symposium on User Interface Software and Technology, pp. 129–138, Oct. 1997.*
Agents Technologies Corporation, "Copernic98 Help Files", printed from the Copernic98 software, 1998.*

(List continued on next page.)

Primary Examiner—Luke S Wassum

(57) ABSTRACT

A computer-implemented method and system providing both query-specific bookmarking and query-specific data collection. These features allow users to search more efficiently on the WWW by allowing users to explicitly maintain their search context. In addition, users can also collect query-specific relevance and usage data. User marked search results are saved as leads, which are displayed on a user interface such as a SearchPad. One embodiment of the invention involves extending HTML to include a Query attribute that saves the query context and returns it with a search result page. Another embodiment involves the use of cookies to save the query context. Saved query-specific bookmarks and query-specific data can be periodically saved to a central site, although not all embodiments perform this task.

6 Claims, 16 Drawing Sheets

OTHER PUBLICATIONS

Lowe, D. "Internet Explorer 3 for Window® for Dummies®", Foster City:IDG Books, pp. 46, 55–58, 277, 1996. TK5105.883.M53 L69 1996. ISBN: 0-7645-0031-7.*

Yuwono, B. and D.L. Lee "Search and Ranking Algorithms for Locating Resources on the World Wide Web", Proceedings of th 12$^{th}$ IEEE International Conference on Daa Engineering, pp. 164–171, 1996.*

Savetz, K.M. "Jiving with Javascript", WebDeveloper Magazine, vol. 2, No. 2, Spring 1996.*

Ellsworth, J. et al., "The Unternet Unleashed 1997", Indianapolis:Sams.net Publishing, 1997, pp. 795–796.*

"Tools to Supercharge Your Searching", Netguide, No. 405, 1997, p. 69.*

Agents Technologies Corporation, "Agents Technologies Updates Copernic, the Industry's Most Advanced Search Tool", Press Release, Aug. 18, 1998.*

Agents Technologies Corporation, "Copernic98 Help Files", printed from the Copernic98 software, 1998.*

Tucows, "Webmaster Resources: WebFerret", downloaded from www.tucows.com, Aug. 9, 1999.*

9malls, "9malls Review of Copernic V. 5.01", downloaded from <www.9malls.com> on Nov. 19, 2002, 3 pages.*

Boutwell, S. "Share the Knowledge", InformationWeek, No. 752, pp. 65–70, Sep. 13, 1999.*

Tucows, "Webmaster Resources: WebFerret", downloaded from <www.tucows.com>, Aug. 9, 1999.*

PR Newswire, "Internationally Acclaimed Internet Search Tool Ready for Japanese Speaking Customers", May 21, 1999.*

Li, W–S et al. "PowerBookmarks: A System for Personalizable Web Information Organization, Sharing and Management", Proceedings of the 8$^{th}$ International World Wide Web Conference, Mar. 1, 1999.*

Copernic, "Agents Technologies Updates Copernic, the Industry's Most Advanced Search Tool", Press Release, Aug. 18, 1998.*

Ellsworth, J. et al. "The Internet Unleashed", Indianapolis::Sams.net Publishing, 1997, pp. 795–796.*

Frazier, W. "If it's on the Internet, NetFerret will Sniff it Out", Government Computer News, vol. 16, No. 16, Jun. 16, 1997, pp. 40–41.*

"Tools to Supercharge Your Searching", Netguide, No. 405, p. 69, 1997.*

Savetz, K.M. "Jiving with Javascript", WebDeveloper Magazine, vol. 2, No. 2, Spring 1996.*

Kryloff Technologies, Inc., "Search the Web with SSSpider", undated, downloaded from www.kryltech.com/search.htm on Jan. 8, 2002, 2 pages.*

Kryloff Technologies, Inc., "Subject Search Spider—Your Personal Web Agent", undated, downloaded from www.kryltech.com/spider.htm on Jan. 8, 2002, 3 pages.*

Li et al. "PowerBookmarks: A System from Personalizable Web Information Organization, Sharing, and Management", Proceedings of the 1999 International Conference on Management of Data, Jun. 1999, pp. 565–567.*

Amento et al. "An Empirical Evaluation of User Interfaces for Topic Management of Web Sites", Proceedings of the CHI 99 Conference on Human Factors in Computing Systems, May 1999, pp. 552–559.*

Li et al., "PowerBookmarks: A System for Personalizable Web Information Organization, Sharing, and Management", Proceedings of the 8th International Web Conference, Mar. 1, 1999, 19 pages.*

Marais et al. "Supporting Cooperative and Personal Surfing with a Desktop Assistant", Proceedings of the 10$^{th}$ Annual ACM Symposium on User Interface Software and Technology, Oct. 1997, pp. 129–138.*

Baldonado et al. "SenseMaker: An Informaiton–Exploration Interface Supporting the Contextural Evolution of a User's Interests", Proceedings of the 1997 Conference on Human Factoes in Computing Systems, Mar. 22–27, 1997, pp. 11–18.*

Direct Hit Technology, "A White Paper" "One Search Engine. Million of Minds," http://www.directhit.com/about/products/technology_whitepaper.thml, (10 pages).

Alexa Tutorial—Vertical, http://www.alexa.com/alexaie/tutorial, (1 page).

Netscape Navigator, wysiwyg://TopicFrame.43/file:/C|/P.../Nethelp/Netscape/navigatr/nav.htm, (18 pages).

Microsoft Internet Explorer5, mk:@MSITStore:c:\windows\Help\iexplore.chm::/org_In-x.htm, mk:@MSITStore:c:/544 windows\Help\iexplore.chm::/org_favs.htm, (3 pages).

Kristol, D. and Montulli, L., "HTTP State Management Mechanism—rfx2109", Netscape Communication, (38 pages), Feb. 1997.

"Persistent Client State HTTP Cookies", Support Documentation, http://home.netcape.com/newsref.std/cookis_spec.html (5 pages).

Bharat, K., Broder, A., Henzinger, M., Marais, H., and Rodeheffer, T., "The Web Archeology Project"http://www.research.digital.com/SRC/personal/Krishna_Bharat/WebArcheology/ (2 pages) http://www.research.digital.com/SRC/personal/Krishna_Bharat/WebAr.../topic_distillation.htm (2 pages).

Brin, S. and Page, L., "CS 349: Data Mining, Search and the World Wide Web", http://www–db.stanford.edu/~sergery/349/, Oct. 1998 (2 pages).

Page, L., "PageRank: Bringing Order to the Web", http:www–pcd.stanford.edu/~page/papers/pagerank/img001.htm (31 page).

* cited by examiner

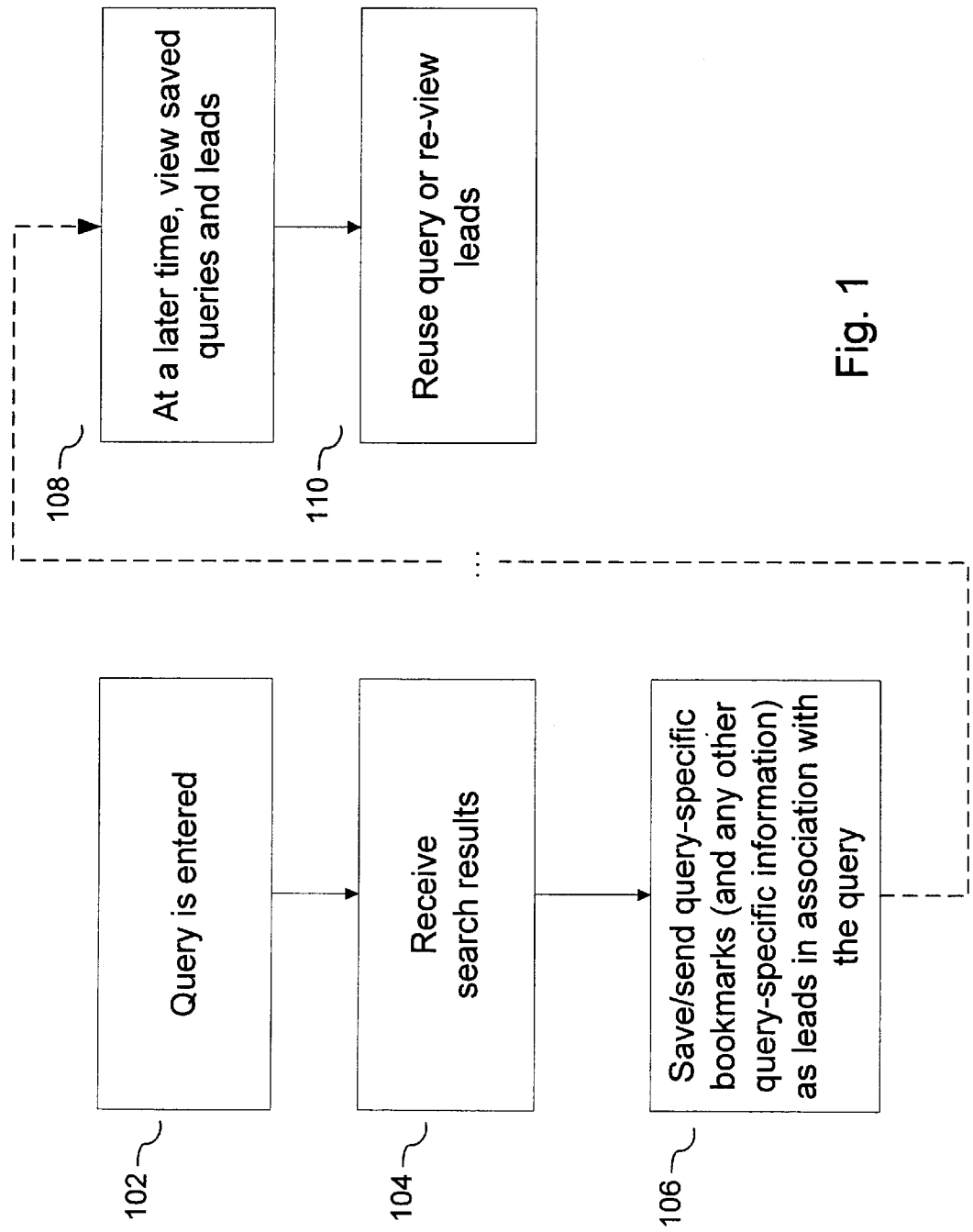

Example of Search Pad (non-html)

Example of Search Pad (html)

Query Specific Browsing
(Using Previously Marked Leads)

Search pad

Search Pad

Example of Search Results (non-html)

Example of Search Results (html)

Marking Leads for a Query

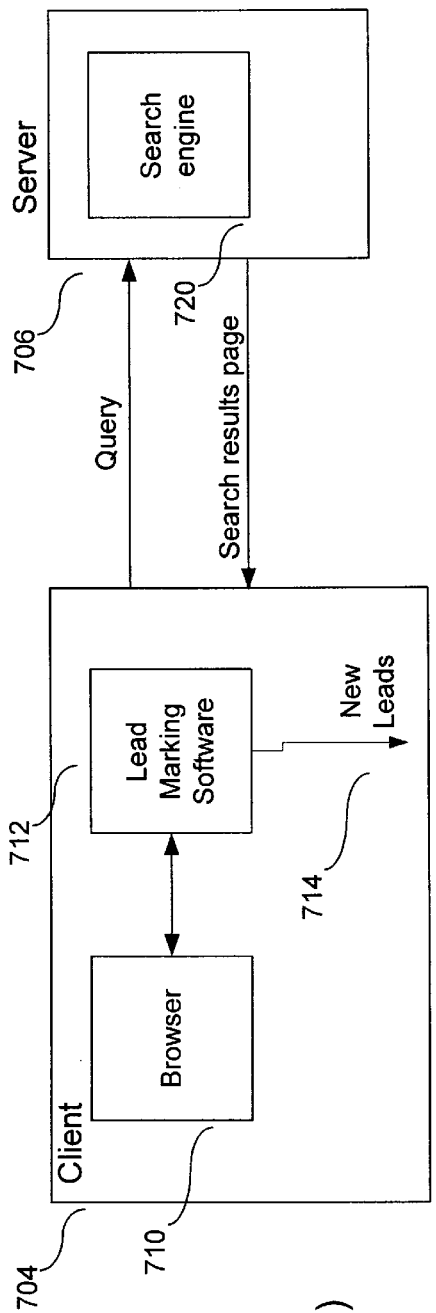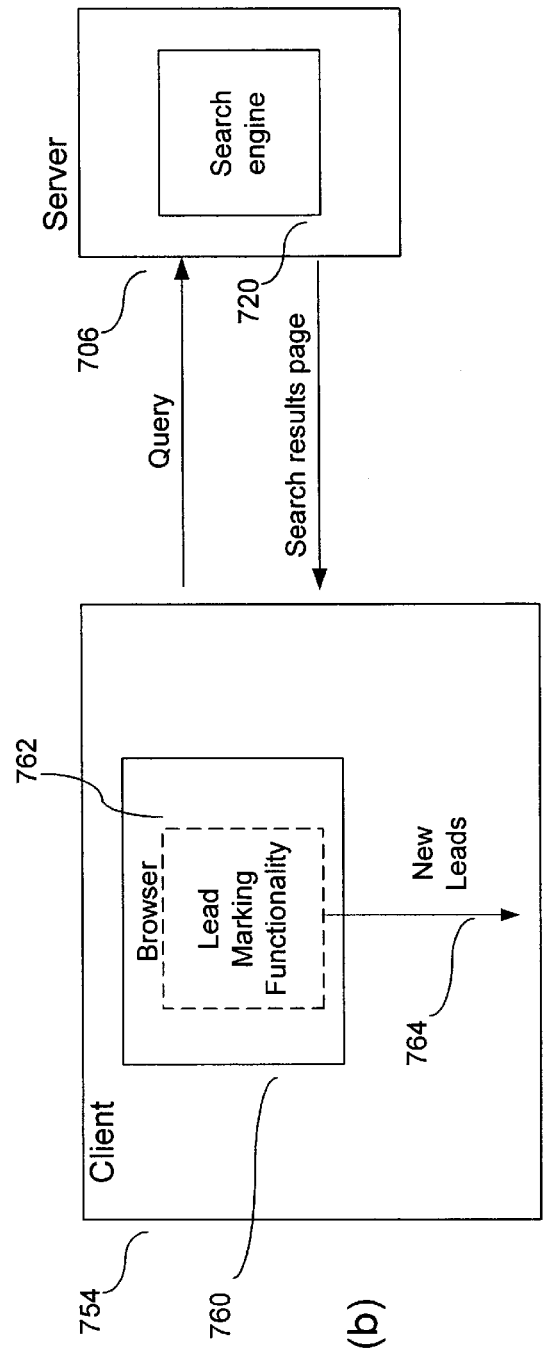
Fig. 7(a)
Fig. 7(b)

Search Pad and Marking Leads
(using cookies)

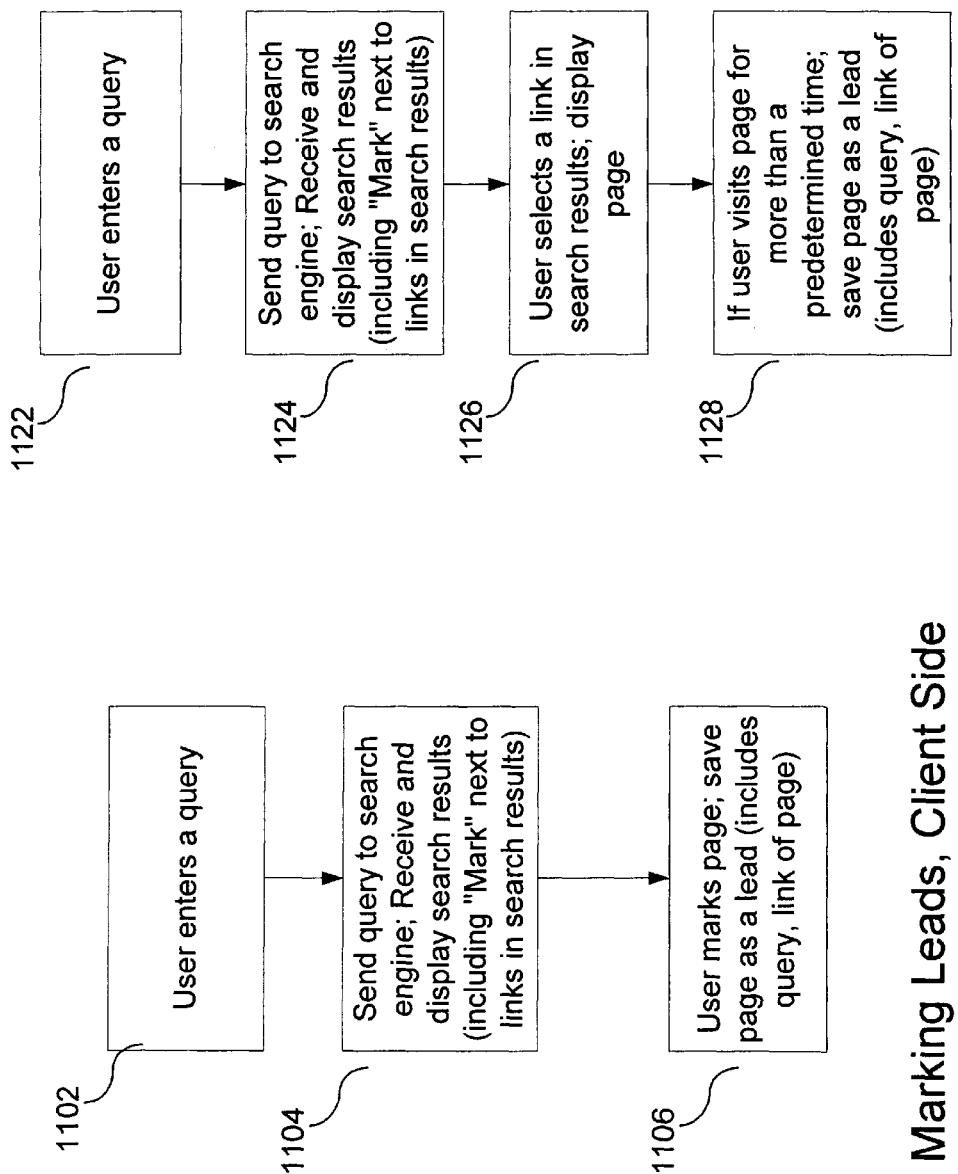

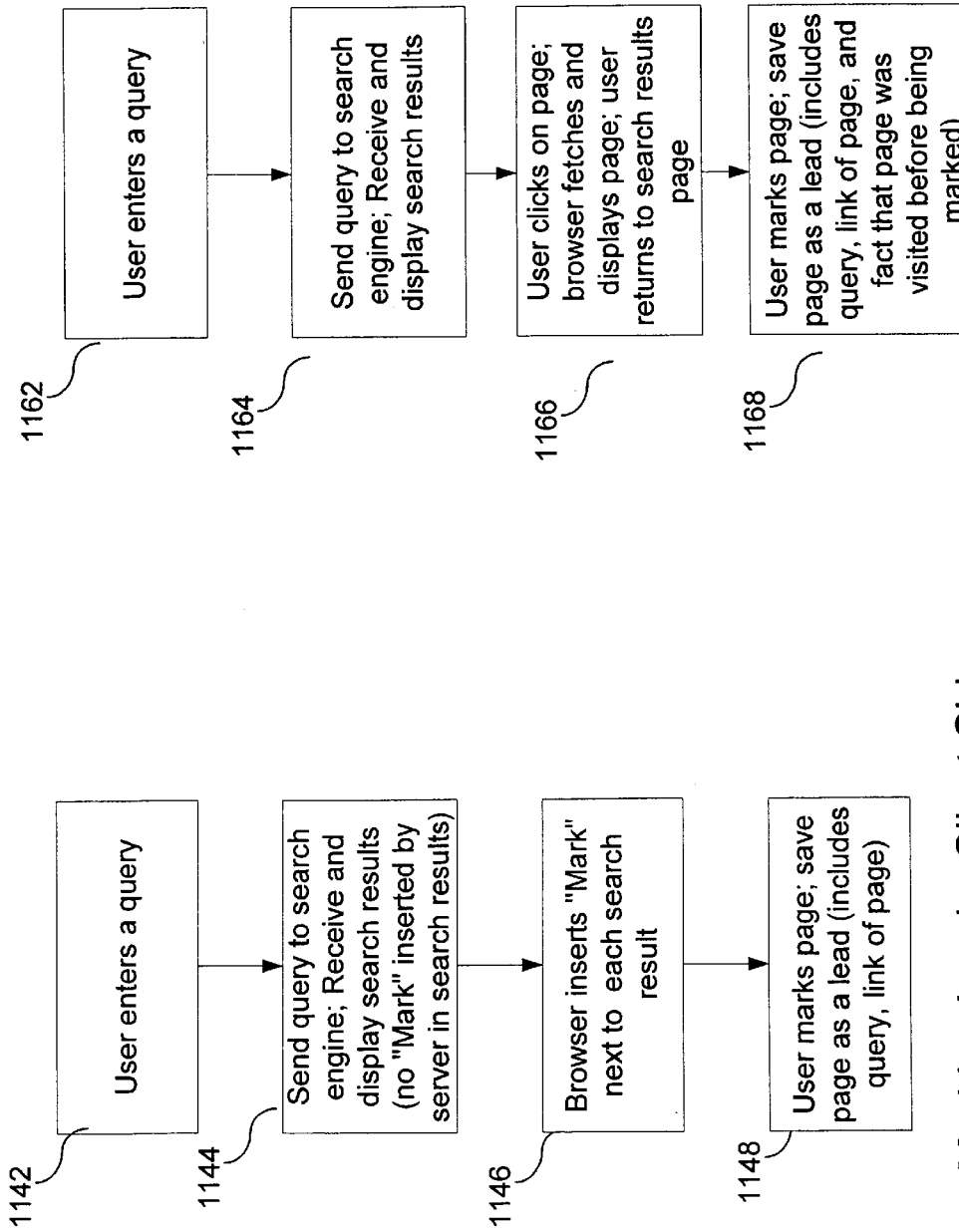

METHOD AND APPARATUS FOR QUERY-SPECIFIC BOOKMARKING AND DATA COLLECTION

BACKGROUND OF THE INVENTION

1. Field of the Invention

The present invention relates generally to software programs and, more generally, to search engines that search large numbers of documents.

2. Description of Background Art

The World Wide Web (WWW) has grown phenomenally in recent years. At the beginning of the web's history, there were hundreds or thousands of web pages in existence. At the present time, there are millions of web pages, and the number is increasing daily. The rapid increase in the number of web pages has increased the difficulty of finding information on the web. Even though the information that a person wants may be available on the web, it is sometimes difficult to locate the page or site that contains the information. If a person performs many searches, it can be difficult to organize the search results and remember how the search results were obtained.

A user searching on the WWW may search on many unrelated topics. More than one browser can be used by a user over time. Users tend to search over many sessions and may terminate and restart their browser between sessions. For each topic searched by a user, the user will probably search on many queries. Users use many search services and may look at more than one search result page. When a user finds a useful result, he is often unsure whether the information found is the best available or whether he should search further. Finding information on the WWW is currently difficult for users because they encounter a large amount of information and have no easy way to keep track of it.

Prior approaches to bookmarking (for example, Netscape Navigator's "Bookmarks" facility and Microsoft Internet Explorer's "Favorites" facility) allow users to save useful hyperlinks in a "bookmarks" list. Users are allowed to group a set of links under a topic, by creating a folder, giving the folder a name, and placing links within the folder. This system is well suited for links that need to be remembered for a long time (i.e., for links corresponding to the user's long-term memory of web pages).

For links that are of temporary interest, such as tentative leads found on a search engine result page (i.e., corresponding to the user's short-term memory of web pages), it takes too much effort to create a folder and give it a name. Hence, users usually do not bookmark tentative information.

Prior approaches to query-specific data collection have required communication with the logging site (usually the search service) each time a result page was visited. Certain conventional approaches extend the web browser to show users statistics about the pages they visit and, in the process, log the pages they visit. Such approaches are not query-specific. Other approaches redirect accesses to result pages through a logging site (usually the search site itself). This approach logs the result pages viewed by the user for each query. However, it also causes a delay in accessing the result page, and increases the network traffic both for the user and the logging site, without providing any additional value to the user. In addition, the described conventional approaches fail to record which result links the user actually found to be relevant to the query.

What is needed is a way to easily keep track of tentative search results and to remember which queries were used to obtain the results.

SUMMARY OF THE INVENTION

The described embodiments of the present invention provide both query-specific bookmarking and query-specific data collection. These features allow users to search more efficiently on the WWW by allowing users to explicitly maintain their search context. A user's search context includes queries recently deployed by the user, along with some or all of the hyperlinks the user looked at and/or liked in the context of each query.

In addition, users can also collect query-specific relevance and usage data. Specifically, the described embodiment can log information including but not limited to: queries that were issued; result pages viewed for each query; result hyperlinks considered relevant for each query; the order in which result pages were viewed; and whether a result hyperlink considered relevant was actually viewed by the user. This type of information can be used, for example, to statistically compare two ranking algorithms or two search services. It can also be used to compute the relevance of pages to queries, which in turn can be used to improve the ranking of search services.

The described embodiments of the present invention arise in the context of WWW search services. They apply both to general-purpose search engines, which facilitate searches over the entire Web, and to specialized search services, which permit searches over private databases. Any service that returns a list of URLs or hypertext addresses in response to a search query can benefit from this invention.

In accordance with the present invention, as described and presented herein, there is provided a computer-implemented method of query-specific bookmarking in a network, comprising: maintaining, on a client-side computer, lead information about a previously performed search, the lead information including the query used in the search and the at least some of the resulting links returned by the search; displaying the query used in the search and the resulting links; receiving a user-selection of a displayed resulting link; and displaying the document corresponding to the selected query-specific link.

In further accordance with the present invention, as described and presented herein, there is provided a computer-implemented method of query-specific bookmarking in a network, comprising: maintaining, on a client-side computer, lead information about a previously performed search, the lead information including the query used in the search and the at least some of the resulting links returned by the search; displaying the query used in the search and the resulting links; receiving a user-selection of a displayed query; and re-submitting the selected query to a search engine.

In further accordance with the present invention, as described and presented herein, there is provided a computer-implemented method for query bookmarking on a client machine, comprising: receiving a result, including a plurality of links, for a query from a search engine; allowing the user to mark one of the plurality of links; and saving the marked link and the query as a query-specific lead.

In further accordance with the present invention, as described and presented herein, there is provided a computer-implemented method of bookmarking a query, comprising: receiving a result for a query, the result including a plurality of links, each link having an associated executable; allowing the user to mark one of the plurality; of links; executing the executable associated with the marked link to store the query and the marked link as a query-specific lead in a cookie accessible by a browser.

In further accordance with the present invention, as described and presented herein, there is provided a computer-implemented method of displaying a bookmarked query, comprising: retrieving a cookie maintained on a client-side computer, the cookie including lead information about a previously performed search, the lead information including the query used in the search and the at least some of the resulting links returned by the search; displaying the retrieved query and the retrieved resulting links; receiving a selection of a displayed resulting link; and causing the document corresponding to the selected link to be displayed.

In further accordance with the present invention, as described and presented herein, there is provided a computer-implemented method of bookmarking a query, comprising: receiving a result for a query, the result including a plurality of links, each link having an associated executable; allowing the user to mark one of the plurality of links; executing the executable associated with the marked link to store the query and the marked link as a query specific lead in a cookie accessible by a browser.

The invention includes comparable apparatus and computer readable media containing instructions executable by a data processor.

BRIEF DESCRIPTION OF THE DRAWINGS

FIG. 1 is a flow chart showing an overview of the creation and use of query-specific bookmarks and query-specific data collection in accordance with a preferred embodiment of the present invention.

FIGS. 7(a) and 7(b) show respective embodiments of systems performing lead marking in accordance with the present invention.

FIGS. 11(a)–11(d) are flow charts showing respective examples of how a user can mark leads.

DETAILED DESCRIPTION OF PREFERRED EMBODIMENTS

I. General Discussion

Figure 2A:
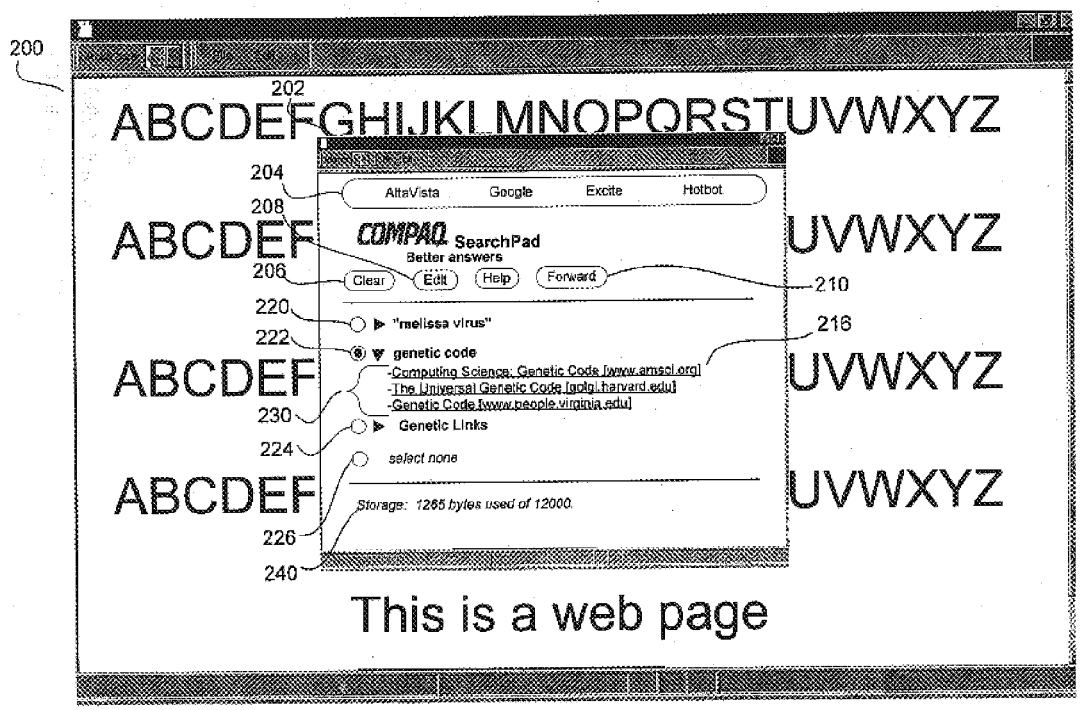
FIGS. 2(a) and 2(b) show respective embodiments of SearchPad interfaces in accordance with the present invention.

The described embodiments of the present invention allow a user to specify and use query-specific bookmarks and information. The described embodiment of the present invention aids the user in his search process by explicitly maintaining the user's search context, including queries recently deployed by the user, along with the hyperlinks the user looked at and/or liked in the context of each query. The following sections will discuss, first, use of such information and, second, creation and specification of such information.

The described embodiments of the present invention allow users to mark queries and promising results (known as leads) associated with queries. The logged information is preferably shown in a convenient manner in a separate window, allowing users to view marked pages and to re-issue marked and recent queries. The data collected may include: recent queries; results the user considered relevant in association with his query; result pages the user looked at and time spent; and the order in which events occurred. This data preferably is periodically transmitted to a server, thus achieving the goal of query-specific data collection.

The described embodiments of the present invention provide an alternative to conventional bookmarks for remembering promising links found during searching. Unlike bookmarks, in the case of leads, the system automatically derives a meaningful category name from the query, and places the leads within it. This allows for promising leads found in response to a query, albeit from various search services, to be filed together, labeled by the query they were found with (or a generalization thereof). Furthermore, unlike conventional bookmarks the described query-specific bookmarks allow for query reuse. Since queries are remembered, they can also be issued again to the same search service or to other search services, in order to continue with the search. Lastly at least one embodiment of the present invention can be implemented without extending the user's web browser or the HTML specification. This allows implementation by search services and third-parties.

Thus, the described embodiment imposes less of a burden on the user than previous schemes. The described embodiments actually provide a search service while collecting data. The described embodiments of the invention generally include two parts:

1) A client-side window called SearchPad to display the user's search context and query-specific leads.
2) A direct or indirect extension of search services to support the communication of leads to SearchPad and the collection of usage data.

FIG. 1 is a flow chart showing an overview of the creation and use of query-specific bookmarks and query-specific data collection in accordance with a preferred embodiment of the present invention. In a first element 102, a query is received from a user (or possibly from another piece of software or from some other appropriate source). In element 104, the query is sent to a search engine and the search results are received in return. In element 106, any search results marked by the user, along with other optional query-specific information is also saved (or is sent to the query-specific display software). The saved information for each search result is called a "lead." In element 108, at a later time, the user views the saved query and/or its query-specific leads. The user can then review or reuse the query and/or the leads. Thus, the user can remember which leads resulted from which queries.

II. Viewing Query-specific Leads

The described embodiments of the present invention support query-specific bookmarking, reducing communication overhead and improving the quality of the data collected. To reduce communication overhead, the described embodiments preferably can periodically transmit a log to the server instead of a communication for every result page visited. Certain of the described embodiments log which pages a user found relevant to a query. This information is of high relevance, since users tend to view many more result pages than those actually relevant to them.

Figure 2B:
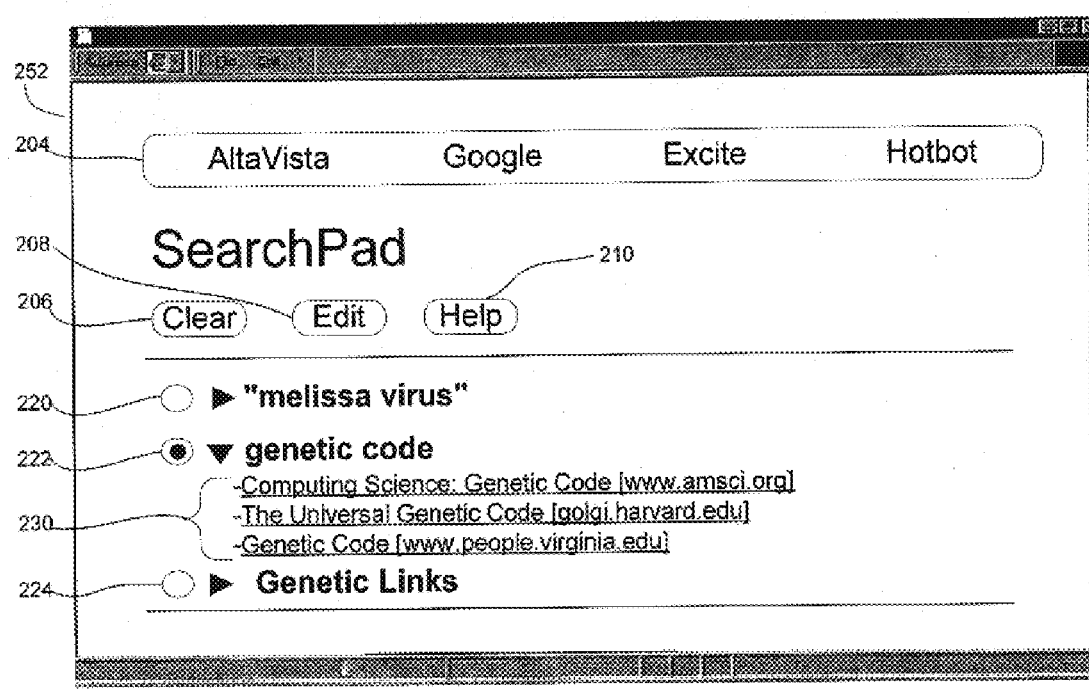

FIGS. 2(a) and 2(b) show respective embodiments of SearchPads in accordance with the present invention. In FIG. 2(a), SearchPad 202 is implemented as a window within a browser 200. The transfer of data from the result page to SearchPad 202 happens internally under software control. In many browsers, this transfer can happen without any access restrictions. SearchPad 202 can be generated by a part of the browser or can be generated by a separate program communicating with the browser. The state of SearchPad 202 is stored on disk or other nonvolatile memory. When the browser is restarted, the state is preferably recovered from disk. In FIG. 2(a), SearchPad 202 includes a bar 204; clear, edit and request buttons 206, 208, 210; queries 220, 222, and 224; and marked search results 230 (specific to query 222). In the Figure, SearchPad 202 also includes a non-query-related selection 226 and memory use information 240. Non-query-related selection 226 allows the user to enter new queries.

For example, FIG. 2(a) shows an example of SearchPad 202 containing the queries: "melissa virus" 220, genetic code 222, and Genetics Links 224. Some queries have quotations marks because that is the way the user typed them in. For query 222, SearchPad 202 shows result links (leads) 230 that are associated with query 222.

A SearchPad can display two types of queries:
(1) All queries for which the user has marked a lead, and/or
(2) Recent queries (for example, the last 5 queries).

Certain embodiments allow the user to specify which of these types of queries are to be displayed, thus displaying one or both types in accordance with the user's instructions. Other embodiments always display one type, or both.

In the example shown in FIG. 2(a), all queries have marked leads (corresponding to type (a) above). The query "genetic code" 222 has three leads associated with it. The first of these leads has the title "Computing Science: Genetic Code." The user can click on a lead's title to load the corresponding web page into a browser window (i.e., visit the link). The lead preferably also includes an address of the page 216.

In this example, clicking on a small triangle next to each of the respective queries exposes or hides the leads associated with a query. In the figure the leads associated with the queries "melissa virus" 220 and Genetic Links 224 are shown as being currently hidden. Such an "outline view" of list data is common in many graphical applications.

The exemplary SearchPad 202 also provides a mechanism for the user to select a query and a search service, and ask for the query to be sent to the search service. In the example in FIG. 2(a), this mechanism is achieved by clicking on a respective one of the circular selectors that precedes the queries that the user is interested in. FIG. 2(a) shows "genetic code" 222 to be selected. Once a query is selected, the user clicks on the name of a search engine at the top 204 (for example, "AltaVista") and SearchPad sends the query to the respective search engine. The user can select more than one query.

Other embodiments are possible. For example, the search engine bar 204 could be replaced by a user-configured choice of a default search engine or a group of search engines.

In the embodiment shown in FIG. 2(a), a lead in SearchPad 202 always corresponds to a result link that the user has marked. In an alternate embodiment, a lead could also correspond to result links that the user visited but did not mark. Optionally, this can happen if the user spent a stipulated time (for example, 30 seconds) viewing the result page. Such leads might be distinguished from regular leads in some way, for example, by being drawn in a different color. Optionally, along with each lead, SearchPad can show the name of the search engine(s) the lead was derived from.

In FIG. 2(b), SearchPad 252 is implemented as a page displayed by a browser. In this embodiment, SearchPad 252 is a part of a browser. For example, the functionality of SearchPad 202 could be built into the browser or SearchPad 202 could be a plug-in of the browser.

Figure 3:
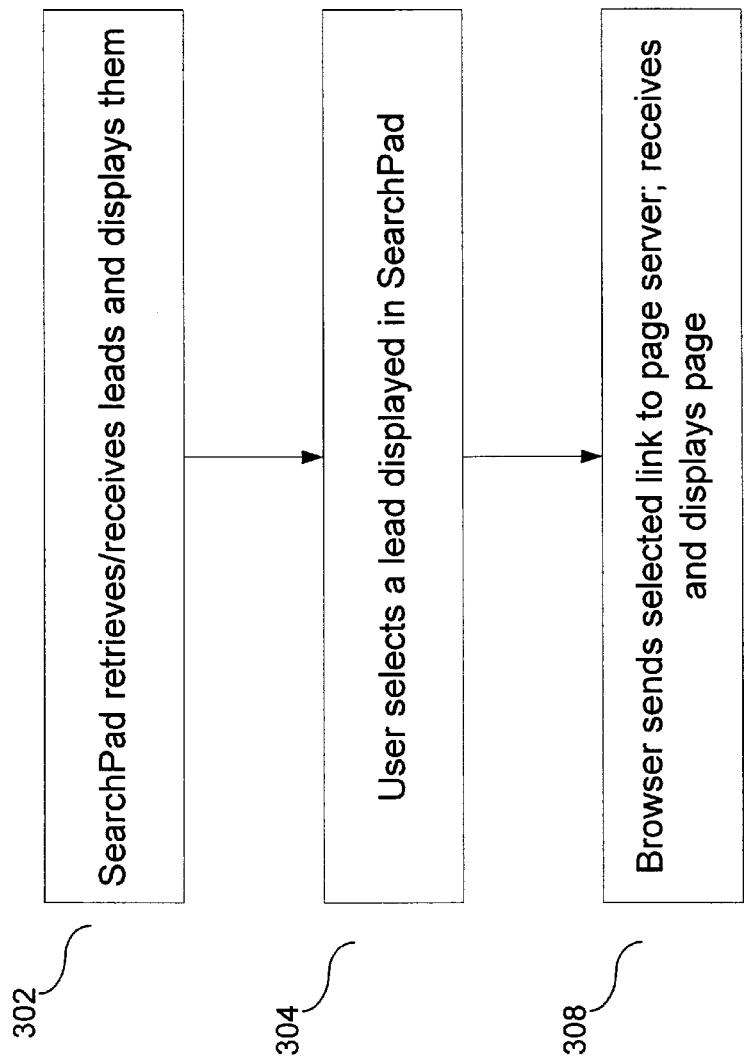
FIG. 3 is a flow chart showing an example of query-specific browsing.

FIG. 3 is a flow chart showing an example of query-specific browsing. In element 302, SearchPad software (such as that generating the SearchPads of FIG. 2(a) or 2(b)) receives (or retrieves) leads and displays them in a SearchPad. In element 304, the user selects a lead displayed in the SearchPad. In element 308, the browser sends the user-selected link to a search engine and then receives and displays the resulting page.

Figure 4A:
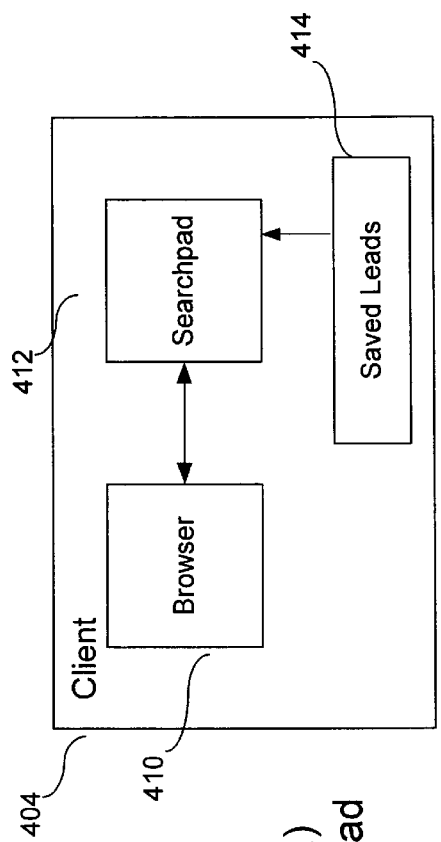
FIGS. 4(a) and 4(b) show respective embodiments of systems displaying query-specific leads in accordance with the present invention.
Figure 4B:
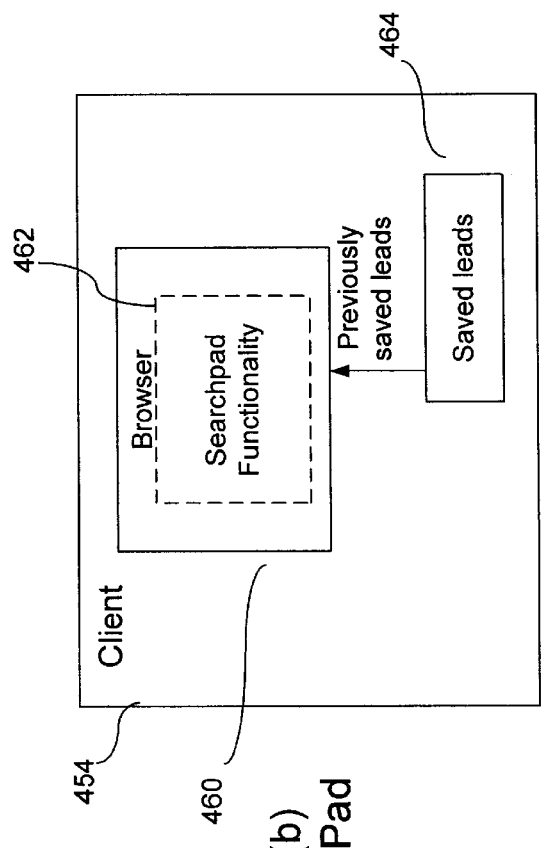

FIGS. 4(a) and 4(b) show respective embodiments of systems displaying query-specific leads in accordance with the present invention. FIG. 4(a) shows a block diagram of the overall architecture of an embodiment of the present invention in which the browser and the SearchPad software are separate. A client system 404 includes browser software 410 and SearchPad software 412. Client system 404 also includes at least one processor and at least one memory, which preferably stores software 410 and 412. In FIG. 4(a), browser 410 and SearchPad software 412 are separate pieces of software that communicate with each other. For example, SearchPad software 412 might communicate with browser 410 via the browser's Application Programming Interface (API) or through some other appropriate mechanism. SearchPad software 412 receives saved leads 414, from, for example, a memory or from lead marking software, as described below.

FIG. 4(b) shows a block diagram of the overall architecture of an embodiment of the present invention in which the browser 454 and the SearchPad functionality 462 are not separate. SearchPad functionality 462 might, for example, be built-into the browser or might be a plug-in to the browser. Client system 454 also includes at least one processor and at least one memory, which preferably stores software 460 and 462. SearchPad functionality 462 receives saved leads 414, from, for example, a memory or from lead marking software.

The methods described herein are preferably implemented as software instructions stored in memory of system 404 and executed by a processor. These instructions can also stored on computer readable medium, such as disk drive, memory, CD ROM, DVD, etc.

III. Extended Search Service

There are several possible ways to create and specify query-specific information.

Figure 5A:
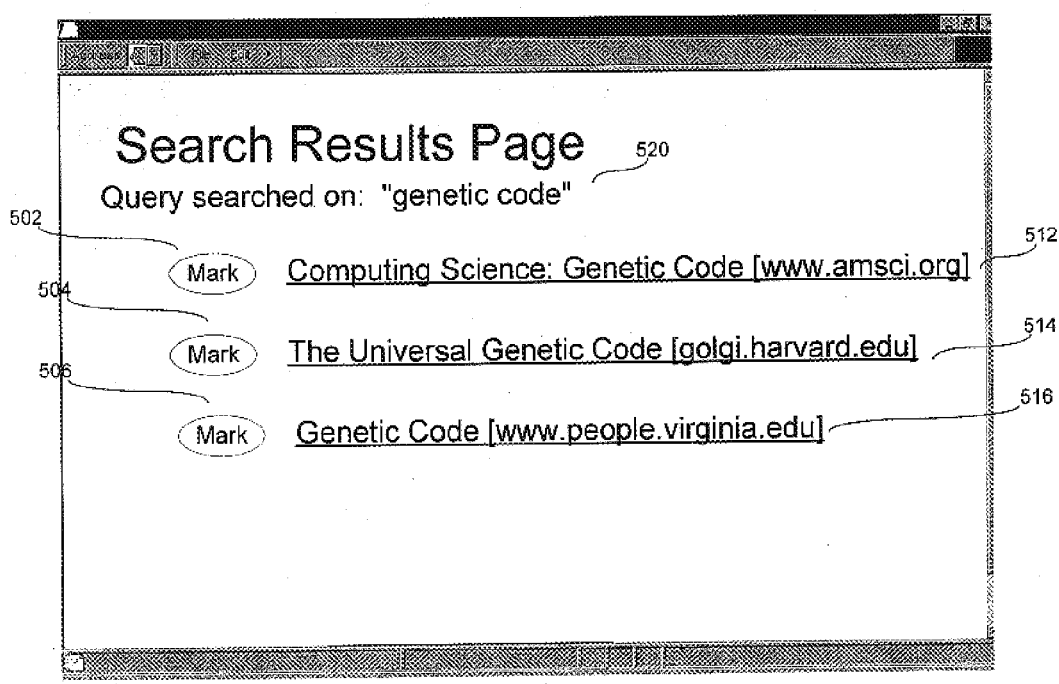
FIG. 5(a) shows an example of a search result page that allows a user to save query-specific bookmarks and data.

FIG. 5(a) shows an example of a search result page that allows a user to save query-specific bookmarks and data. This search result page is displayed after a query is received (for example, from a user or from other software) and sent to the search engine. In the example, the query is "genetic code" 222. The described embodiment gives users a way to mark a link in the search result. FIG. 5(a) shows Mark buttons 502, 504, 506 associated with each result link 512, 514, 516 from a search engine. Clicking a Mark button causes the associated link to be saved or displayed in association with the query 222. In the described embodiment, if a link has already been marked, the user action has no effect.

Figure 5B:
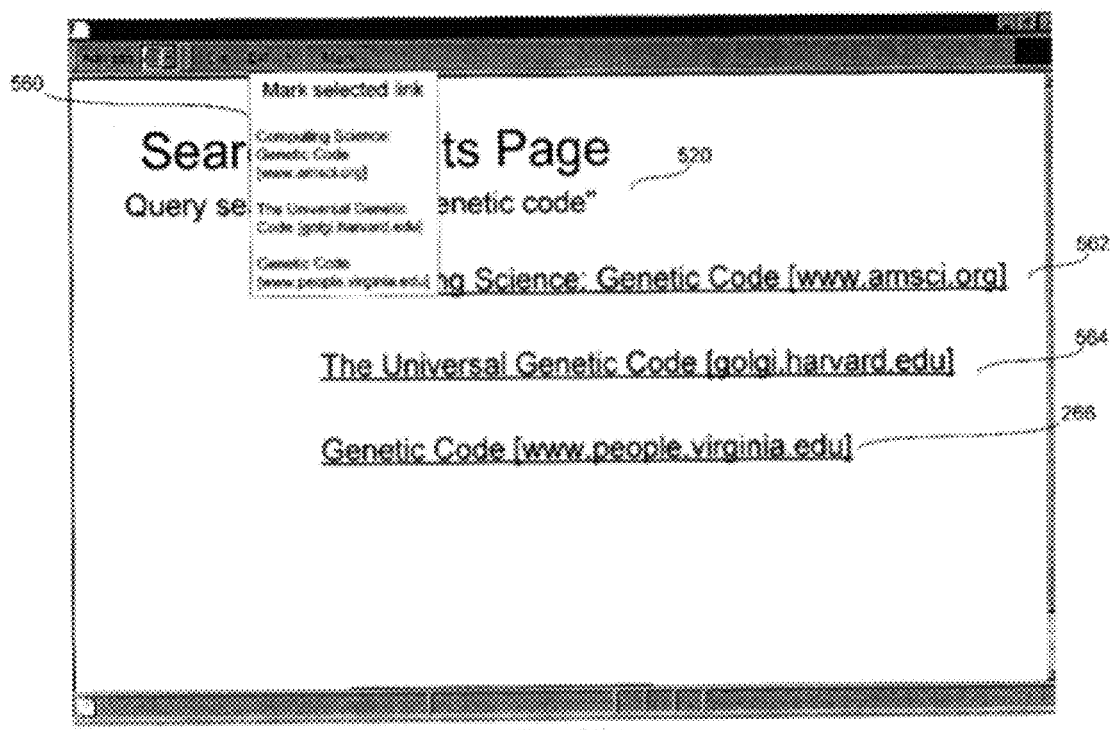
FIG. 5(b) shows another example of a search result page that allows a user to save query-specific bookmarks and data.

FIG. 5(b) shows another example of a search result page that allows a user to save query-specific bookmarks and data. Instead of a Mark button, the browser displays a drop-down menu 560 that allows the user to create or specify a lead. In the example, when the user selects "save link" from the drop-down menu, the browser causes a user-selected link to be saved or displayed in association with the query 220.

Figure 6:
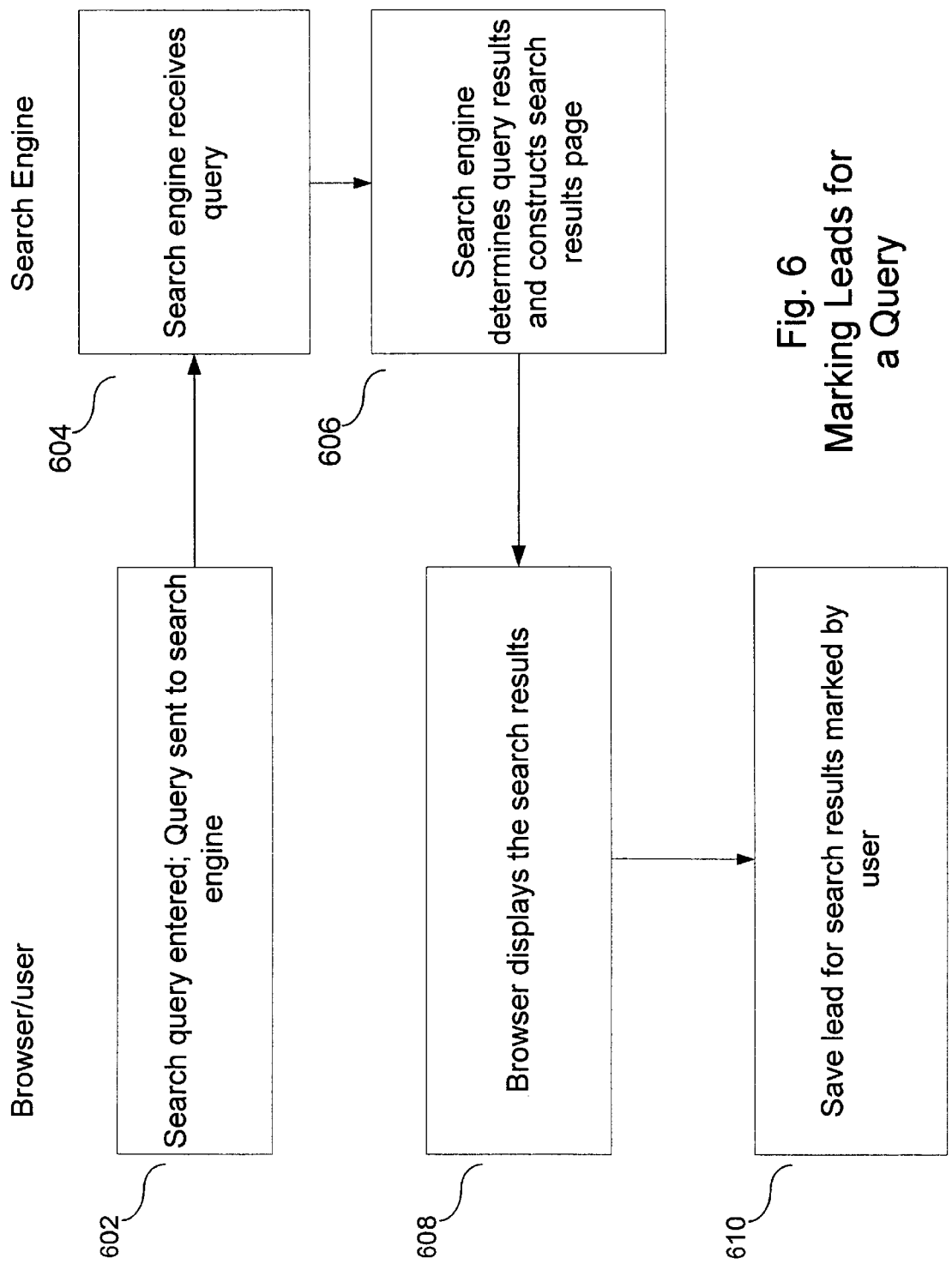
FIG. 6 is a flow chart showing an example of marking leads for a query.

FIG. 6 is a flow chart showing an example of marking leads for a query. In element 602, a query is entered (either by a user or by other software). The query is passed to a search engine in element 604. In element 606, the search engine determines query results and constructs a search result page, which is returned to the browser/user. In element 608, the browser displays the search results and, in element 610, the user selects and marks the leads he wants to save. These leads are then stored and/or sent to SearchPad.

FIGS. 7(a) and 7(b) show respective embodiments of systems performing lead marking in accordance with the present invention. FIG. 7(a) shows a block diagram of the overall architecture of an embodiment of the present invention in which the browser and the lead marking software are separate. A client system 704 includes browser software 710 and lead marking software 712. Client system 704 also includes at least one processor and at least one memory, which preferably stores software 710 and 712. In FIG. 7(a), browser 710 and lead marking software 712 are separate pieces of software that communicate with each other. For example, lead marking software 712 might communicate with browser 710 via the browser's Application Programming Interface (API) or through some other appropriate mechanism. Lead marking software 712 sends new leads 714, to, for example, a memory or to SearchPad software.

FIG. 7(b) shows a block diagram of the overall architecture of an embodiment of the present invention in which the browser 760 and the lead marking functionality 762 are not separate. Lead marking functionality 762 might, for example, be built-into the browser or might be a plug-in to the browser. Client system 754 also includes at least one processor and at least one memory, which preferably stores software 760 and 762. Lead marking functionality 762 sends new leads 764, to, for example, a memory or to SearchPad software.

FIGS. 7(a) and 7(b) show that the marked leads are saved. In a preferred embodiment, the query and query-specific leads are saved to disk, then retrieved and displayed. The query and leads can also be sent directly to a query-specific display software, such as SearchPad software.

i. html modification implementation

Figure 8A:
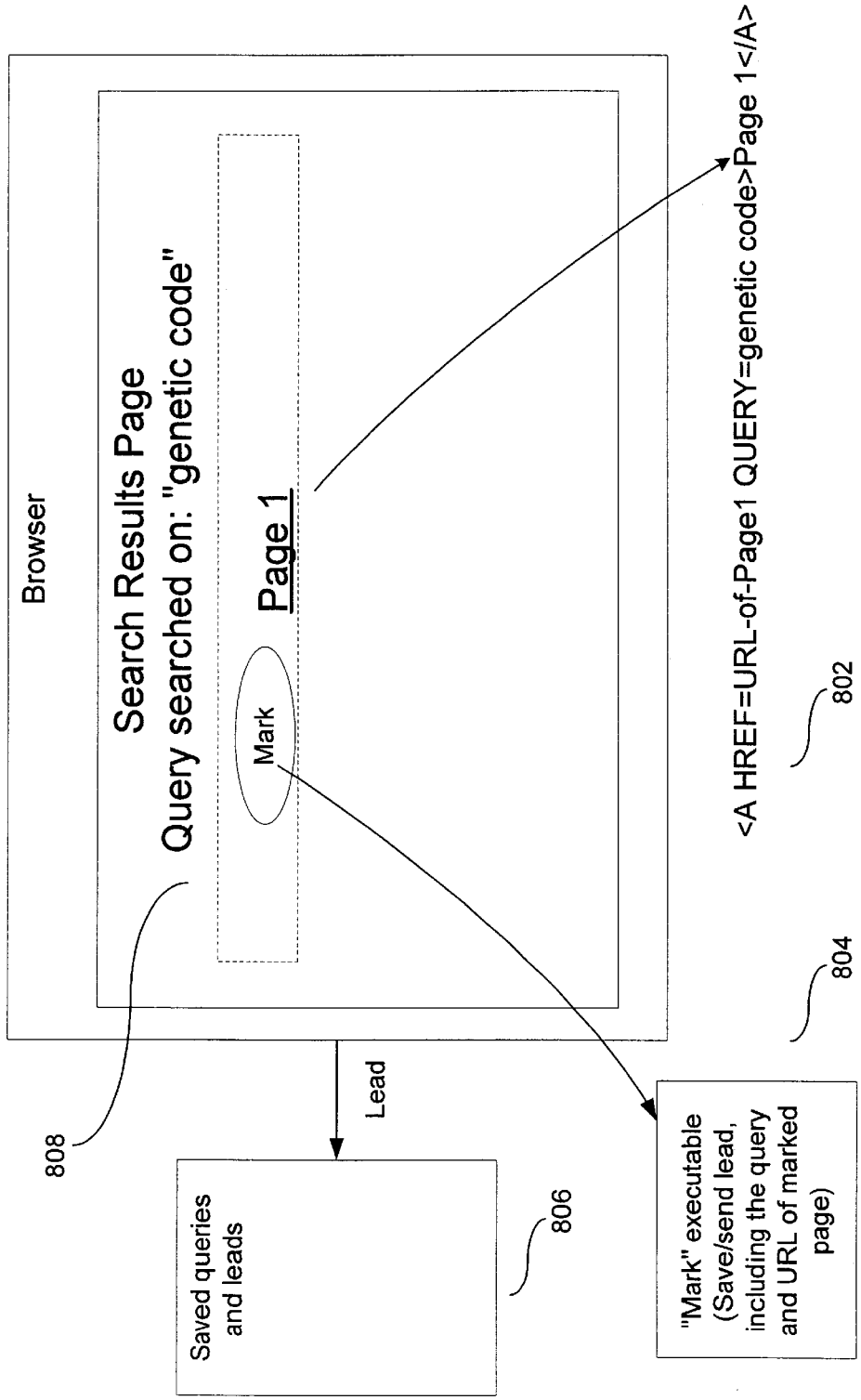
FIG. 8(a) is a diagram of an embodiment of the present invention in which lead marking software is built into the client side.

FIG. 8(a) shows an example of a search result page in an embodiment that preferably involves a modification to the browser functionality. A hyperlink in currently conventional HTML is currently specified thus:

<A HREF=url-of-hyperlink>hyperlink-anchor</A>

To support the implementation of FIG. 8(a), the <A . . . >tag is extended with an extra attribute called "QUERY," which contains the query being used. This allows the browser to have access to the user's query at the same time that he receives the search results.

As shown in FIG. 8(a), for example, the hyperlink 802 placed on the results page for the query "genetic code" could have the format:

<A HREF=url-of-result-page-hyperlink QUERY="genetic code">hyperlink-anchor </A>

The use of the QUERY attribute tells the browser (or a software extension to the browser or led marking software) that the current hyperlink is available for marking by the user, and that the hyperlink needs to be remembered in association with the specified query ("genetic code" in the above example). Thus, the QUERY attribute allows the browser to ascertain for which query the page was a result. When the marking operation is invoked, the browser software recognizes that this link can be exported as a lead and takes the corresponding action.

As shown in FIG. 8(a), a search result page 808 includes a Mark button (or a pull-down menu or other appropriate interface). It also includes an associated link (here, to "Page 1"). This link includes the QUERY attribute.

Figure 8B:
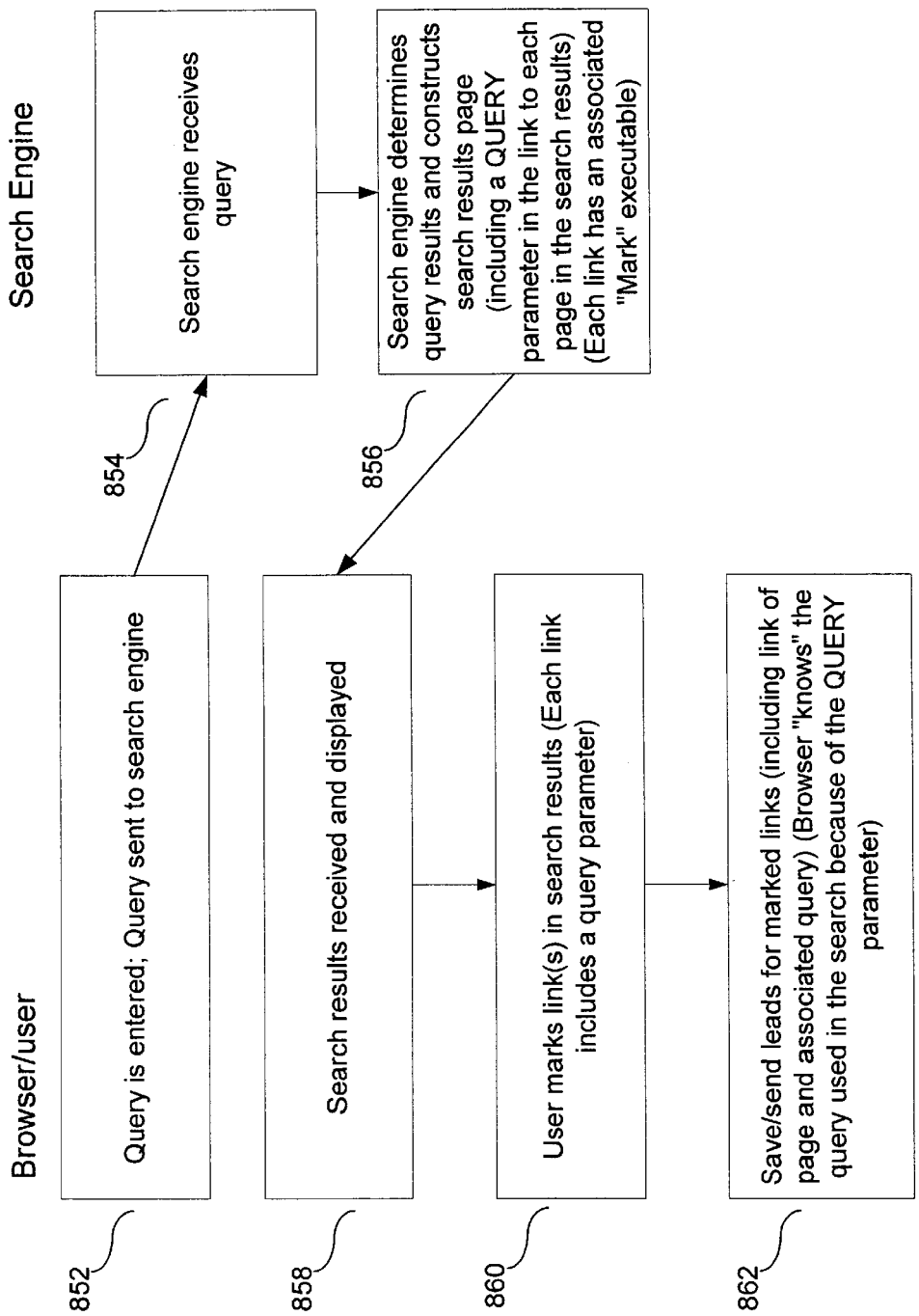
FIG. 8(b) is a flow chart showing an example of marking query-specific leads in the system of FIG. 8(a).

FIG. 8(b) is a flow chart showing details of the embodiment of FIG. 8(a). Elements on the left are preferably performed by client software. Elements on the right are preferably performed by a search engine or other producer of search results data. In element 852, a query is received from a user (or possibly from another piece of software). The query is sent to a search engine, which receives the query in element 854. In element 856, the search engine determines query results and constructs a search result page. In this embodiment, this search result page includes a QUERY parameter in the link of each page in the search results. The search result page may also include an executable associated with a mark button if the interface of FIG. 2(a) is being implemented. In element 858, the search results are received and displayed. (In certain embodiments, software on the client side may add Mark buttons, such as shown in FIG. 2(a)). In element 860, the user marks a page (by clicking on the Mark button or drop-down menu.) In element 862, both the query and the link itself are saved (or sent for display). The query is known at this point because it is a part of the link 802 marked by the user.

A shortcoming of this approach is that it requires a change to the syntax of HTML (to add the QUERY attribute) and, possibly, a change to browser software to recognize the query attribute. This will limit the popularity of this approach. Also, this implementation requires a consensus between browser manufacturers and search services on the syntax of URLs.

ii. Cookie-based implementation

We next describe an alternate implementation that does not require browser manufacturers to change their software, or for search services to cooperate with the browser manufacturer. This alternate implementation is an implementation without Browser Extension or Client-Side Software Installation. This can be deployed both by search services themselves, and by third parties who wish to add value to one or more search services.

Figure 9A:
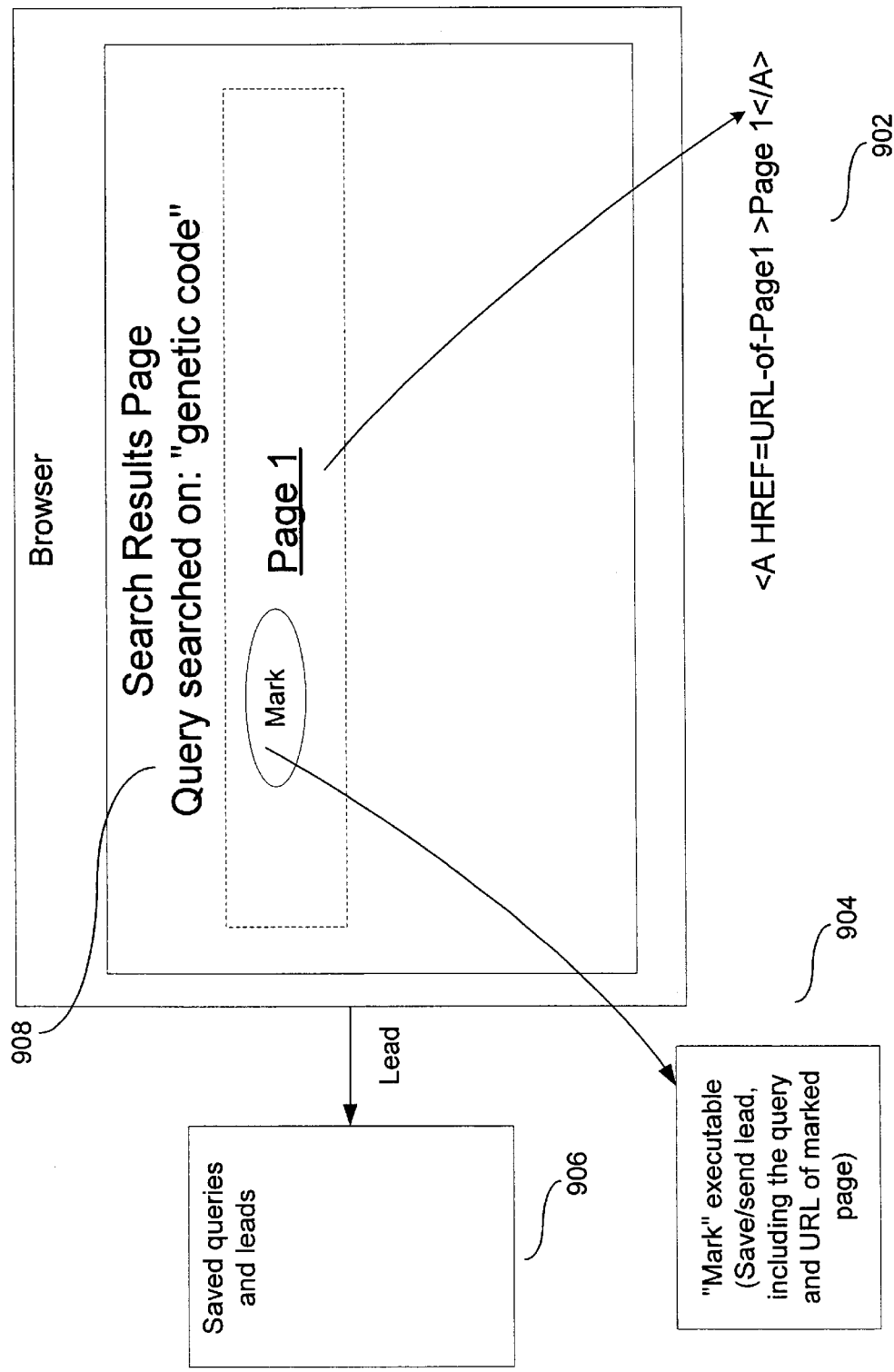
FIG. 9(a) is a block diagram of another embodiment of the present invention in which lead marking functionality is built into the client side.

FIG. 9(a) is a block diagram of another embodiment of the present invention in which lead marking functionality is built into the client side. In this embodiment, a result page 908 from the server is extended with code in a scripting language. When the user marks a link, the associated scripting code 904 communicates the link's URL 902 and associated information to a corresponding piece of code in a display element, such as SearchPad software. In the described embodiment, the query-specific display software is implemented as an HTML document containing embedded code either in the form of a scripting language such as Javascript or VB Script, or as an applet in Java. The code within the query-specific display software receives the query-specific information and updates its display showing the new link.

Embedded scripts tend to be subject to many restrictions by the browser, both in terms of access (i.e., limited access to other windows) and storage (no access to the file system) in the normal mode of operation. In some web browsers, the embedded scripts can ask the user for more access to the web browser's state. Nonetheless, this is not useful because many users will refuse such a request, since it represents a security risk.

FIG. 9(a) shows an example of a search result page in an embodiment that does not require a modification to the browser functionality. It should be noted that link 902 has a conventional link format, not the extended format of FIG. 8(a). In this embodiment, search service (or a proxy server through which the search service is accessed) is responsible for embedding a button (or similar device) 903 within each search result to allow the user to "mark" the result as a lead. The button 903 can be implemented as an image with a hyperlink to embedded code 904 in JavaScript (or similar scripting language). The code 904 is invoked when button 903 is clicked, and causes relevant information about the link and query to be written to a log (known as the access log) associated with the web site.

In the described embodiment, this log is maintained in a set of cookies associated with the web site. The log could also be maintained on the web site server or at some other third-party machine.

Figure 9B:
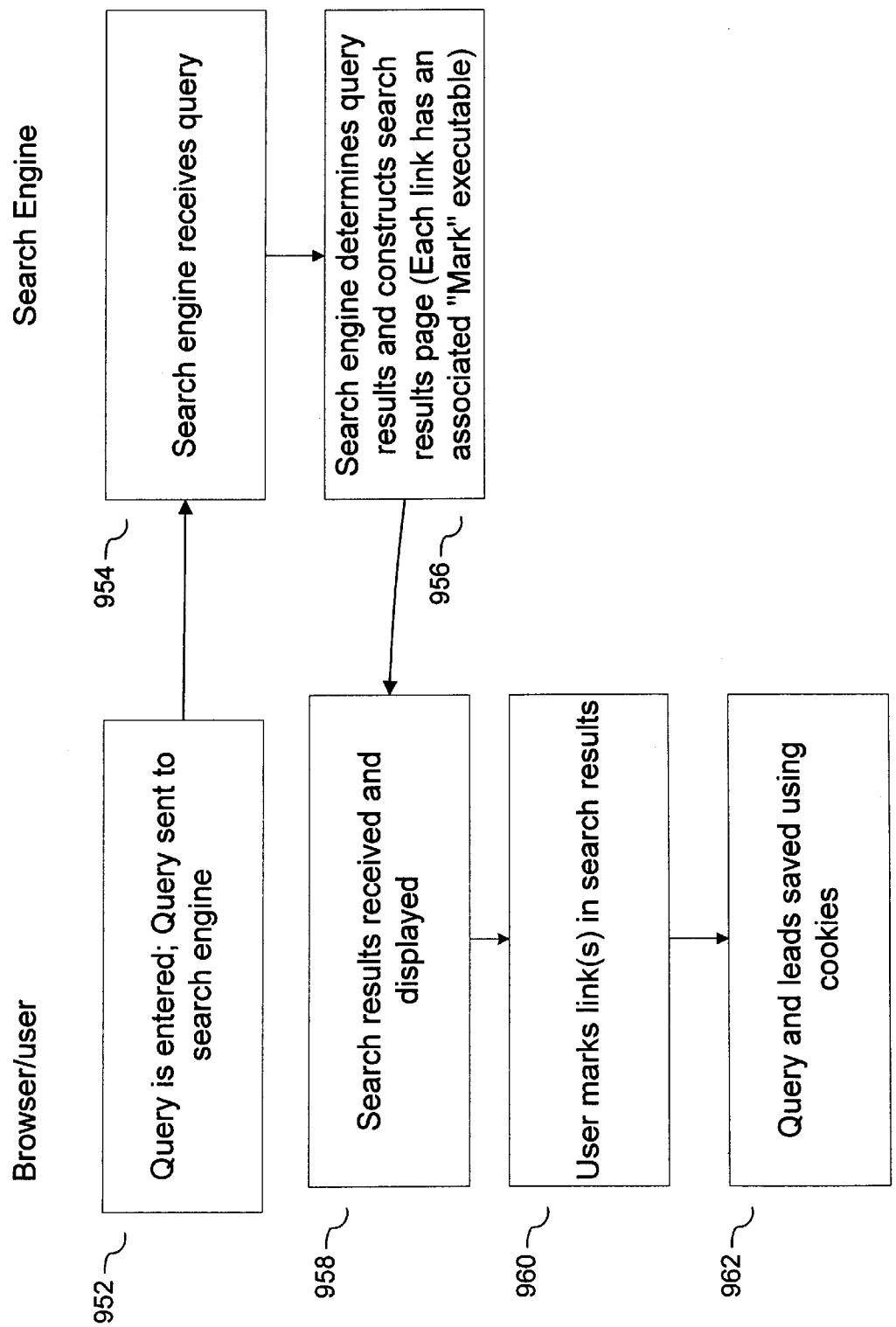
FIG. 9(b) is a flow chart showing an example of marking query-specific leads in the system of FIG. 9(a).

FIG. 9(b) is a flow chart showing an example of marking query-specific leads in the system of FIG. 9(a). In element 952, a query is received from a user (or possibly from another piece of software). The query is sent to a search engine, which receives the query in element 954. In element 956, the search engine determines query results and constructs a search result page. The search result page may include an executable associated with a mark button if the interface of FIG. 2(a) is being implemented. In element 958, the search results are received and displayed. (In certain embodiments, software on the client side may add Mark buttons, such as shown in FIG. 2(a)). In element 960, the user marks a page (by clicking on the Mark button or drop-down menu.) In element 962, both the query and the link itself are saved (or sent for display).

Figure 10:
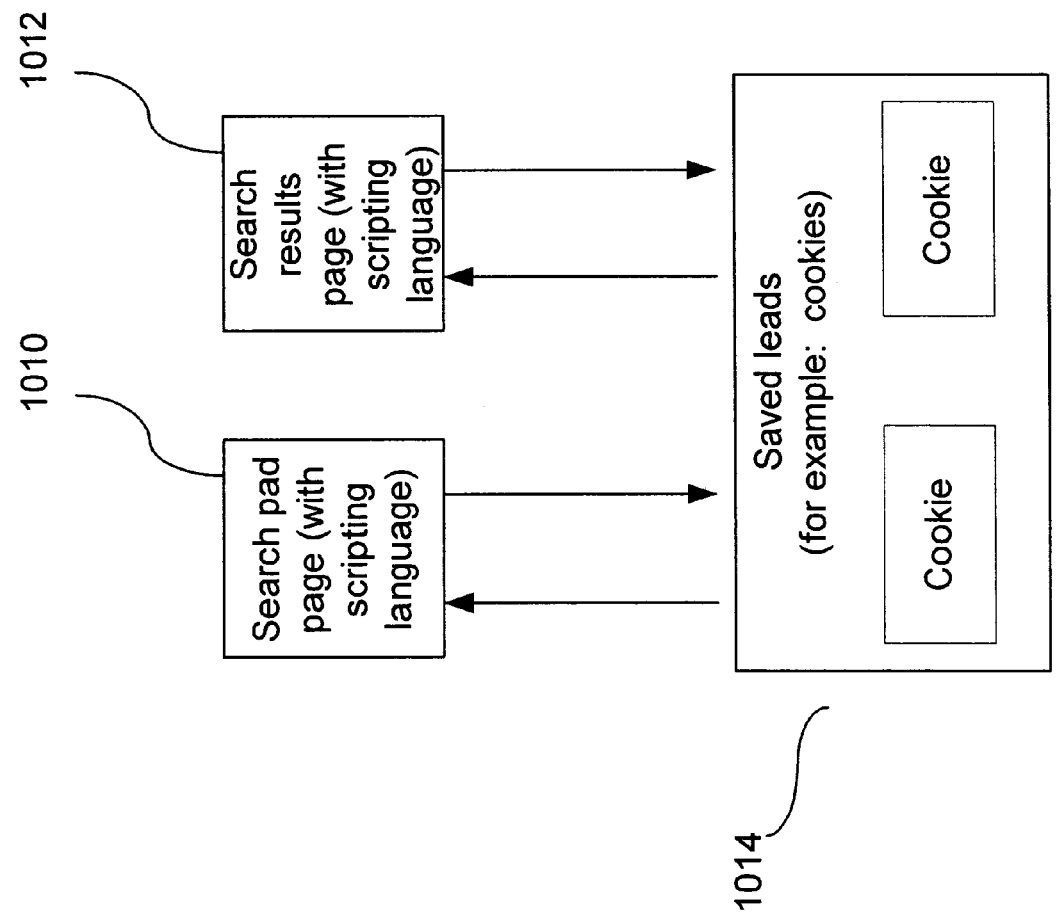
FIG. 10 is a block diagram of an embodiment that uses cookies to store the query-specific bookmarks and data.

FIG. 10 is a block diagram of an embodiment that uses cookies to store the queries, query-specific bookmarks and data. The system includes SearchPad software 1010 and software 1012 displaying and processing a search result page. In the described embodiment, cookies 1014 provide a mechanism for host-specific persistent client-side storage, both for communication and for persistent storage. (See RFC 2109 and Netscape's documentation on cookies.) RFC 2109 is herein incorporated by reference. A client, such as Netscape's Navigator, which implements RFC 2109, will support a limited amount of client-side storage in the form of cookies. In the described embodiment, each cookie holds 4 Kb of text data, and each host a user visits will be allowed up to 20 cookies, which are available to scripts from that host. Other cookie sizes can, of course, be used. Cookies are persistent and save their state on the user's hard disk. This allows the query-specific display software to remember marked leads across web browser sessions.

All the information collected above resides in a set of cookies associated with the originating web site, and is available to scripts executing within other pages downloaded from the same site. In particular it is visible to SearchPad, which is an HTML document containing an embedded script (for example, in Javascript, Java or VB Script). All the data needed by SearchPad to display marked queries and leads to the user is available in the cookie access log. When the cookie access log is updated due to a new event, SearchPad reads the cookies and changes its display to reflect the new state. For this purpose, when the log is updated, either the code in the result page can signal SearchPad to notify that the state has changed, or SearchPad can periodically examine the cookie log to see if new leads have been added.

In time, the storage available in the cookie access log will be exhausted. At this point either the user can be prevented from marking any more leads (unless some are deleted), or SearchPad can compress the data.

To compress data in the cookie access log, SearchPad merely reloads itself. The cookies comprising the cookie access log are configured so that they are transmitted to the web server every time SearchPad is reloaded. This has the effect that all the data in the log can be saved at the server. Some of it is used for the data collection task. The data in the cookies is cleared, except for a pointer to where the previous data is stored on the server.

In at least one embodiment, some of the access log data, stored on the server, is hardwired into the SearchPad script in future transmissions of SearchPad's code to that particular user. This is used to display marked queries and leads. Because the data resides in the SearchPad script and not the cookie access log, the access log has more space for logging future events.

To ensure timely data collection SearchPad can be configured to periodically reload itself, thus logging the user's activity periodically. Furthermore, to avoid transmitting the cookies to the server during other communications, the cookies are configured so that they will be transmitted only when SearchPad is reloaded.

iii. Methods of marking leads

FIGS. 11(a)–11(d) are flow charts showing respective examples of how a user marks leads in various embodiments of the present invention.

In FIG. 11(a), as shown in FIG. 2(a), when a query is entered, the resulting results page includes a "Mark" button next to each result. When the user marks a page, the query and link are saved.

In FIG. 11(b), when the user clicks on a link on the search result page, the browser then displays the page, as in known in the art. If the user visits the page for more than a predetermined time, the link of page is saved as a lead in conjunction with the query.

In FIG. 11(c), the search result page does not include a "Mark" button. A Mark button is inserted on the client side.

In FIG. 11(d), when the user clicks on a link on the search result page, the browser then displays the page, as in known in the art. If the user returns to the search result page and then marks the link, the link of the visited page is saved as a lead in conjunction with the query. In addition, the fact that the user visited the page is saved. Such an implementation could also save the length of time of the visit.

In general, a saved lead includes at least a query and a link resulting from the query (or a series of links can be saved in association with a single query). For example, the following can be logged for each "mark" action:

The query

The Title, URL and rank of the result being marked

The time at which the event occurred

Similarly, when a result's hyperlink is clicked to view the result page, we can log the same type of information in association with the "view" event. When the user returns to the page containing search results after viewing a result page, the "return" event can be logged as well, with a timestamp. When a "return" event follows a "view" event, the time difference provides an estimate of the time spent viewing the result page.

From the above description, it will be apparent that the invention disclosed. herein provides a novel and advantageous system and method of searching large numbers of hypertext documents, such as the hypertext documents of the world wide web.

What is claimed is:

1. A computer-implemented method of bookmarking a query, comprising:

receiving a result for a query, the result including a plurality of links, each link having an associated executable and each link is capable of being marked;

allowing the user to mark one of the plurality of links;

allowing a user to specify whether all queries having at least one marked link are to be displayed or whether all of a predetermined number of the most recent queries are to be displayed; and executing the executable associated with the marked link to store the query and the marked link as a query-specific lead in a cookie accessible by a browser.

2. The method of claim 1 further comprising marking a link once the link has been displayed for a predetermined period of time.

3. A system, comprising:

a processor;

storage containing software that, when executed by the processor, causes the processor to allow a user to mark a link in a query result, the link having an associated executable:

allow a user to specify whether all queries having at least one marked link are to be displayed or whether all of a predetermined number of the most recent queries are to be displayed; and execute the executable associated with the marked link to store the query and the marked link as a lead in a cookie accessible by the processor.

4. The system of claim 3 wherein the software also causes the processor to mark a link in a query if the link has been displayed for more than a threshold amount of time.

5. A computer accessible storage medium containing software that when executed by a processor causes the processor to:

allow a user to mark a link in a query result, the link having an associated executable;

allow a user to specify whether all queries having at least one marked link are to be displayed or whether all of a predetermined number of the most recent queries are to be displayed; and execute the executable associated with the marked link to store the query and the marked link as a lead in a cookie accessible by the processor.

6. The storage medium of claim 2 wherein the software also causes the processor to mark a link in a query if the link has been displayed for more than a threshold amount of time.

* * * * *